United States Patent
Linn et al.

(10) Patent No.: US 6,735,756 B1
(45) Date of Patent: May 11, 2004

(54) METHOD AND ARCHITECTURE FOR DYNAMIC DEVICE DRIVERS

(75) Inventors: John H. Linn, Albuquerque, NM (US); Richard P. Moleres, Albuquerque, NM (US)

(73) Assignee: Xilinx, Inc., San Jose, CA (US)

( * ) Notice: Subject to any disclaimer, the term of this patent is extended or adjusted under 35 U.S.C. 154(b) by 119 days.

(21) Appl. No.: 10/082,436

(22) Filed: Feb. 22, 2002

(51) Int. Cl.[7] .............................................. G06I 17/50
(52) U.S. Cl. ................................. 716/16; 716/1; 716/3
(58) Field of Search .................... 716/16, 1–3; 709/321, 709/327, 223; 717/140, 148, 70; 710/33

(56) References Cited

U.S. PATENT DOCUMENTS

| | | | |
|---|---|---|---|
| 5,361,373 A | | 11/1994 | Gilson |
| 5,537,601 A | | 7/1996 | Kimura et al. |
| 5,652,904 A | | 7/1997 | Trimberger |
| 5,671,355 A | | 9/1997 | Collins |
| 5,752,035 A | | 5/1998 | Trimberger |
| 5,970,254 A | | 10/1999 | Cooke et al. |
| 6,020,755 A | | 2/2000 | Andrews et al. |
| 6,096,091 A | | 8/2000 | Hartmann |
| 6,279,045 B1 | | 8/2001 | Muthujumaraswathy et al. |
| 6,282,627 B1 | | 8/2001 | Wong et al. |
| 6,292,855 B1 | * | 9/2001 | Johnson et al. ................ 710/33 |
| 6,343,207 B1 | | 1/2002 | Hessel et al. |
| 6,393,495 B1 | * | 5/2002 | Flory et al. .................. 709/327 |
| 6,434,742 B1 | * | 8/2002 | Koepele, Jr. ................. 717/140 |
| 6,473,824 B1 | * | 10/2002 | Kreissig et al. .......... 348/222.1 |
| 6,477,643 B1 | * | 11/2002 | Vorbach et al. ............. 713/100 |
| 6,522,167 B1 | * | 2/2003 | Ansari et al. .................. 326/39 |
| 2002/0112227 A1 | * | 8/2002 | Kramskoy et al. .......... 717/148 |
| 2002/0178243 A1 | * | 11/2002 | Collins ....................... 709/223 |
| 2003/0048473 A1 | * | 3/2003 | Rosen ........................ 358/1.15 |
| 2003/0088866 A1 | * | 5/2003 | Boldon et al. ............... 717/170 |
| 2003/0101290 A1 | * | 5/2003 | Lin et al. .................... 709/327 |
| 2003/0135663 A1 | * | 7/2003 | Duncan et al. ............. 709/321 |
| 2003/0145127 A1 | * | 7/2003 | Unice ......................... 709/321 |

OTHER PUBLICATIONS

Cary D. Snyder and Max Baron; "Xilinx's A–to–Z System Platform"; Cahners Microprocessors; The Insider's Guide to Microprocessor Hardware; Microdesign Resources; Feb. 6, 2001; pp. 1–5.

* cited by examiner

*Primary Examiner*—Matthew Smith
*Assistant Examiner*—Magid Y. Dimyan
(74) *Attorney, Agent, or Firm*—Pablo Meles; Lois D. Cartier

(57) ABSTRACT

In a plurality of logical device driver instances, each instance (201) representing a specific version (220) of the device driver, can be accessed by an embedded application (200) via a common interface (205). A logical device driver instance includes the common interface which includes a plurality of functions (206–209) linked to the embedded application. A logical device driver also includes a virtual function table (211) having pointers (212–215) that points from each of the plurality of functions of the common interface to a plurality of functions (221–224) of a specific version of the device driver among a plurality of versions of the device driver. The virtual function table is set up dynamically during run-time initialization of a logical device driver instance.

28 Claims, 3 Drawing Sheets

METHOD AND ARCHITECTURE FOR DYNAMIC DEVICE DRIVERS

TECHNICAL FIELD OF THE INVENTION

This invention relates generally to real time operating systems and in particular to a method and arrangement for dynamically changing device drivers in embedded systems.

BACKGROUND OF THE INVENTION

Programmable devices are a class of general-purpose integrated circuits that can be configured for a wide variety of applications. Such programmable devices have two basic versions, mask programmable devices, which are programmed only by a manufacturer, and field programmable devices, which are programmable by the end user. In addition, programmable devices can be further categorized as programmable memory devices or programmable logic devices. Programmable memory devices include programmable read only memory (PROM), erasable programmable read only memory (EPROM) and electronically erasable programmable read only memory (EEPROM). Programmable logic devices include programmable logic array (PLA) devices, programmable array logic (PAL) devices, erasable programmable logic devices (EPLD) devices, and programmable gate arrays (PISA).

As chip capacity continues to increase significantly, the use of field programmable gate arrays (FPGAs) is quickly replacing the use of application specific integrated circuits (ASICs). An ASIC is a specialized microprocessor chip that is designed for a particular application. Notably, a FPGA is a programmable logic device (PLD) that has an extremely high density of electronic gates as compared to an ASIC. This high gate density has contributed immensely to the popularity of FPGA's. Notably, FPGAs can be designed using a variety of architectures which can include user configurable input/output blocks (IOBs), and programmable logic blocks having configurable interconnects and switching capability.

The advancement of computer chip technology has also resulted in the development of embedded processors and controllers. An embedded processor or controller can be a microprocessor or microcontroller circuitry that has been integrated into an electronic device as opposed to being built as a standalone module or "plugin card." Advancement of FPGA technology has led to the development of FPGA-based system-on-chips (SoC) including FPGA-based embedded processor system-on-chips. A SoC is a fully functional product having its electronic circuitry contained on a single chip. While a microprocessor chip requires ancillary hardware electronic components to process instructions, a SoC would include all required ancillary electronics. For example, a SoC for a cellular telephone can include a microprocessor, encoder, decoder, digital signal processor (DSP), RAM and ROM. It should be understood within contemplation of the present invention that an FPGA-Based SoC does not necessarily include a microprocessor or microcontroller. For example, a SoC for a cellular telephone could include an encoder, decoder, digital signal processor (DSP), RAM and ROM that rely on an external microprocessor. It should also be understood herein that "FPGA-based embedded processor SoCs" are a specific subset of FPGA-based SoCs that would include their own processors.

FPGA-based SoC have resulted in the proliferation of numerous consumer devices such as wireless telephones, personal digital assistants (PDAs), and digital cameras. In order for device manufacturers to develop FPGA-based SoCs, it is necessary for them to acquire intellectual property rights for system components and/or related technologies that are utilized to create the FPGA-based SoCs. These system components and/or technologies are called cores or IP cores. An electronic file containing system component information can typically be used to represent the core. A device manufacturer will generally acquire several cores that are integrated to fabricate the SoC.

In order to make their SoC products more marketable, SoC vendors are adding software support for the embedded or external processors. Software support includes device drivers and board support packages, and integration of these with various operating systems and processors. The hardware configuration of an FPGA-based SoC product can change over the product's lifetime due to the programmable nature of the FPGA. Hardware devices within an FPGA-based SoC can be added or updated. A wide variety of systems, which can include any number of processors, busses, and peripherals can be easily built and rebuilt. An SoC vendor would want to provide software solutions that accommodate this ever-changing hardware and that would minimize the software development and maintenance costs and associated impact to customer applications. The programable nature of the FPGA dictates the need to change device drivers that support hardware devices within the FPGA.

Besides having numerous devices, a system can have multiple versions of the same device. On desktop computer systems (such as PC or Sparc), multiple versioning of devices is typically handled at the device driver level by one of two ways: (1) A single device driver supporting multiple versions of hardware. This is typically achieved through compiler directives or decision constructs spread throughout the source code. As the number of versions grows, so does the complexity of the device driver, quickly becoming a software maintenance nightmare. (2) Multiple device drivers, one for each version of the hardware. In an embedded system where an application is usually statically linked, each driver would require a different application programming interface (API) if the system were to support multiple versions of the device at the same time. Application developers would face a tremendous burden trying to support multiple interfaces to logically similar devices. Each driver could have the same API, but this limits the system and the application to only one version of the hardware device. This could be a severe limitation if adding a new device to a widely deployed SoC means upgrading all other devices of that same type within the SoC. Thus, a need exists for multiple device drivers with a common API, such that embedded applications can link these drivers into a single executable binary. Ideally, this flexible and dynamic device driver architecture would ease the maintenance burden of ever-changing hardware both for the SoC vendor and the customer using the SoC. Such an arrangement would be desirable for hardware vendors or programmable devices, such as Field Programmable Gate Array (FPGA) based System on Chip (SoC) vendors that are destined to provide software support for programmable hardware.

SUMMARY OF THE INVENTION

In a first aspect of the present invention, a logical device driver instance comprises a common interface for the device driver which comprises a plurality of functions linked to at least an embedded application. The logical device driver instance represents an instance of the hardware device. The logical device driver instance also comprises a virtual function table that points from each of the plurality of functions of the common interface to a plurality of functions of a specific version of the device driver among a plurality of versions of the device driver. Preferably, the plurality of function pointers in the virtual function table are set up dynamically during run-time initialization of the logical device driver instance. The logical device driver instance also comprises the specific version of the device driver pointed to by the virtual function table.

In a second aspect of the present invention, a method of supporting multiple device driver versions using a common interface to an embedded application comprises the steps of initializing a logical device driver instance through the common interface so that a plurality of functions for a given version of the device driver among a plurality of device driver versions are mapped to the common interface using a virtual function table and invoking the common interface with the embedded application to communicate with the given version of the device driver.

In a third aspect of the present invention, a method of simultaneously supporting a plurality of device driver versions using a common interface to an embedded application comprises the steps of initializing each logical device driver instance in a plurality of logical device driver instances through the common interface so that a plurality of functions of each version of the device driver among a plurality of device driver versions are mapped to the common interface using a virtual function table for each logical device driver instance and invoking the common interface with the embedded application to communicate with any instance of the device driver. Each logical device driver instance in the plurality of logical device driver instances can represent a different version of the device driver.

DETAILED DESCRIPTION OF THE DRAWINGS

The present invention utilizes virtual function tables in a device driver architecture to support a common device driver interface for multiple versions of a device. The architecture described herein is especially useful in embedded applications on highly configurable systems such as FPGA-based SOCs that make use of multiple versions of a hardware device. Having multiple versions of a hardware device in a system may require multiple versions of a device driver. Every instance of the hardware device in the system has a corresponding instance of the device driver. This instance is referred to as a logical device driver instance. Each logical device driver instance can represent a different version of the device driver. All logical device driver instances share the same common interface with which an embedded application can communicate to the device driver. Each logical device driver instance contains a virtual function table that maps functions in the common interface to the functions in a specific version of the device driver. The virtual function table for each logical device driver instance is initialized dynamically at run-time when the application initializes the logical device driver instance through the common interface. The virtual function table is pointed to an appropriate version of the device driver. Function calls made through the common interface are mapped via the virtual function table to the interface of the appropriate device driver version. This architecture will be discussed in further detail with respect to FIG. 2 and FIG. 3.

The object-oriented concept of polymorphism is applied in the present invention to provide an application with a common interface to multiple device drivers. Polymorphism refers to the ability to have more than one method with the same signature in an inheritance hierarchy, where the correct method is invoked at run-time based on the context (object) on which the method is invoked. The common device driver interface presented in this invention resembles a base class interface in an inheritance hierarchy. A base class is a class from which other classes can be derived. Each version of the device driver represents a derivation of the base class interface. The dynamic configuration of the virtual function table, which maps functions in the common interface to functions in a specific version of the device driver, provides the polymorphic behavior of a function invoked through the common interface.

Figure 1:
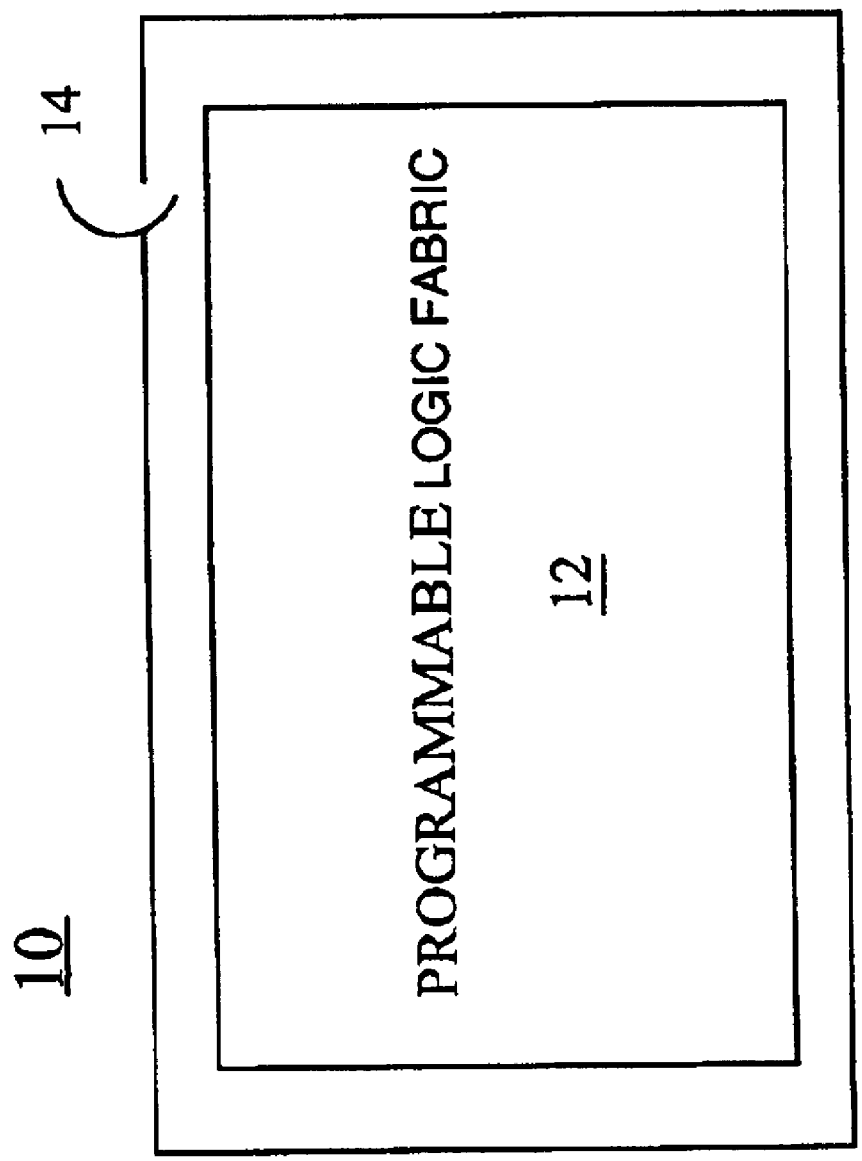
FIG. 1 illustrates a schematic block diagram of a prior art field programmable gate array.

Field programmable gate arrays (FPGA) have become very popular for telecommunication applications, Internet applications, switching applications, routing applications, and a variety of other end user applications. FIG. 1 illustrates a generic schematic block diagram of a field programmable gate array (FPGA) 10. The FPGA 10 includes programmable logic fabric 12 (containing programmable logic gates and programmable interconnects) and programmable input/output blocks 14. The programmable input/output blocks 14 are fabricated on a substrate supporting the FPGA 10 and are coupled to the pins of the integrated circuit, allowing users to access the programmable logic fabric 12. The programmable logic fabric 12 may be programmed to perform a wide variety of functions corresponding to particular end user applications and may be implemented in a variety of ways.

Figure 2:
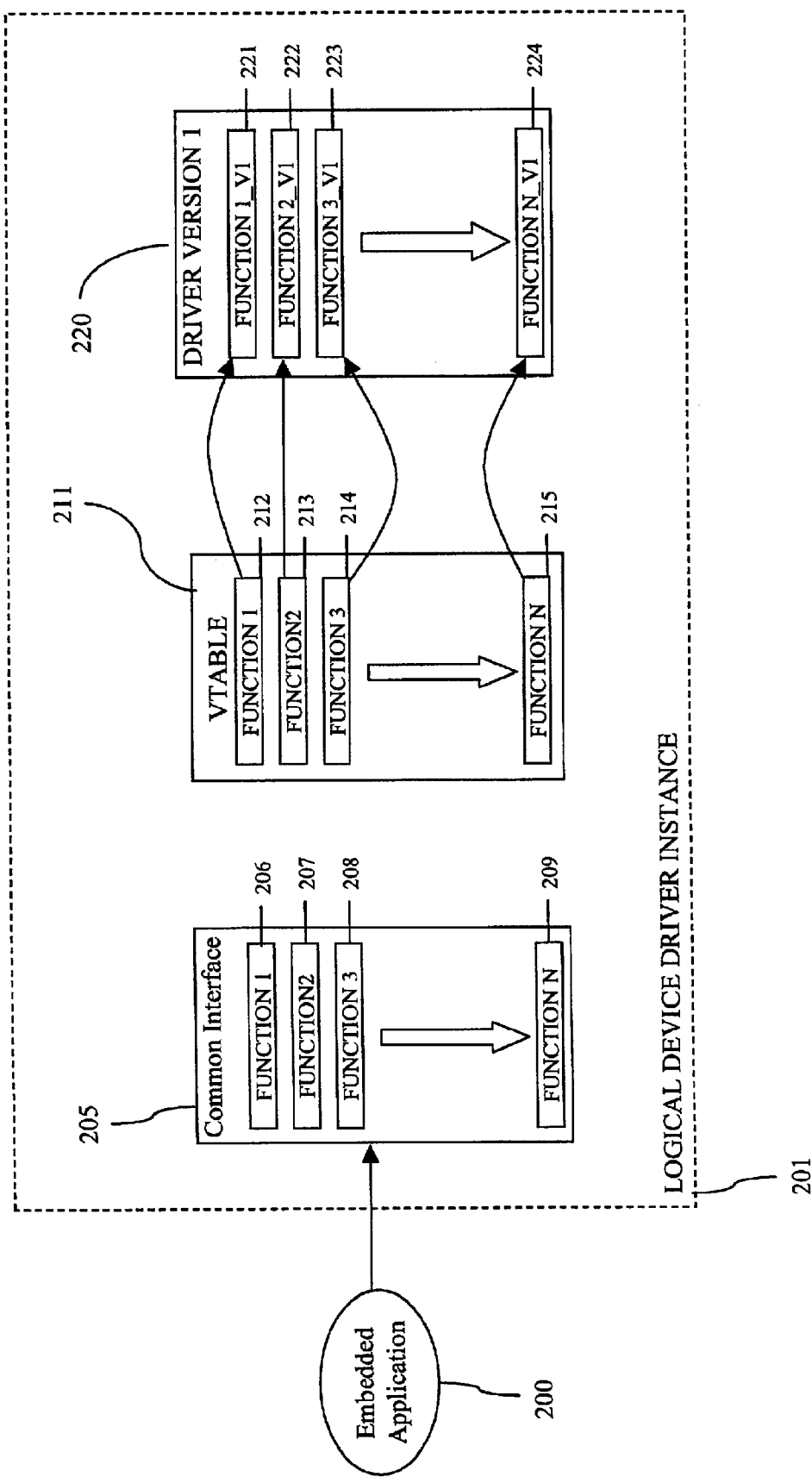
FIG. 2 is a block diagram of a logical device driver instance illustrating a common interface and a virtual function table pointing to a given version of a device driver in accordance with the present invention.

Referring to FIG. 2, a block diagram of a logical device driver instance 201 illustrating a common interface 205 and a virtual function table 211 pointing to a given version (220) of a device driver is shown. The hardware device and the device driver are preferably embedded in a Field Programmable Gate Array (FPGA) as contemplated in the present invention, but it should be understood that the device driver could also be external to the FPGA. A common interface 205 for the logical device driver instance 201 comprises a plurality of functions (206–209) linked to an embedded application 200. A virtual function table 211 comprises a plurality of function pointers (212–215) that point from each of the plurality of functions of the common interface (206–209) to the plurality of functions (221–224) corresponding to a specific version (220) of the device driver among a plurality of versions of the device driver.

Preferably, the plurality of function pointers (212–215) is set up during an initialization of the logical device driver instance 201 through the common interface 205. The virtual function table 211 preferably maps the plurality of functions (206–209) of the common interface to the plurality of functions (221–224) of the specific version of the device driver (220). It should be understood that each logical device driver instance points to a specific version of the device driver. Once initialization of the logical device driver instance 201 occurs, the embedded application 200 invokes the plurality of functions of the common interface 205 to communicate to the logical device driver instance 201. The common interface 205 serves as a common device driver interface for multiple versions of the same device. From FIG. 2, it should also be understood that the plurality of function pointers (212–215) of the virtual function table 211 are dynamically linked during initialization of the logical device driver instance 201, but then remain statically linked to the single executable of the embedded application 200 until the logical device driver instance is re-initialized.

Figure 3:
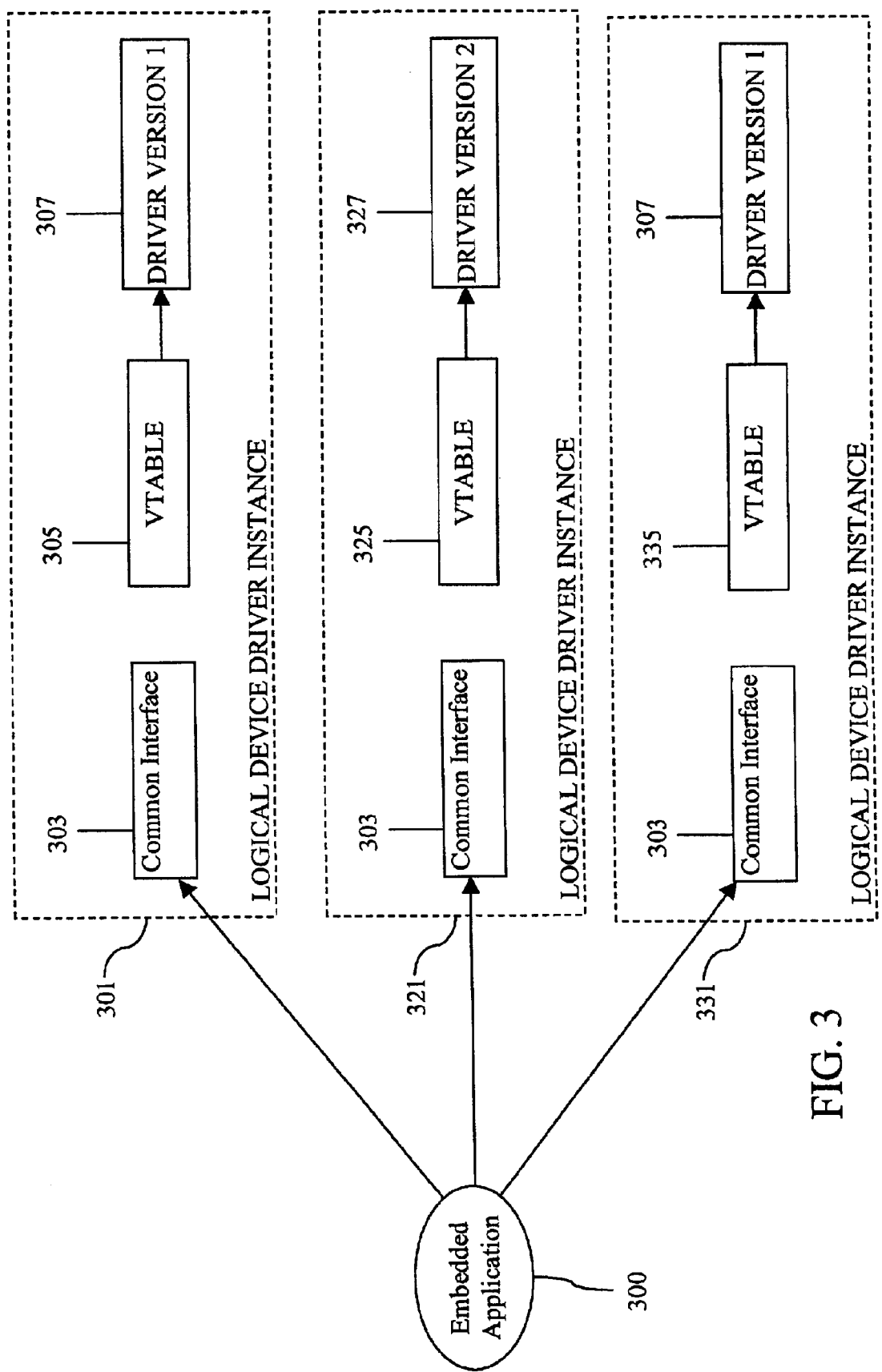
FIG. 3 is a block diagram of multiple logical device driver instances illustrating a common interface and virtual function tables pointing to multiple versions of a device driver in accordance with the present invention

Referring to FIG. 3, a block diagram of multiple logical device driver instances (301, 321, 331) of a device driver illustrating a shared common interface (303) and a virtual function table (305, 325, 335) for each instance pointing to a specific version (307 and 327, for example) of a device driver is shown. The hardware device and the device drivers are preferably embedded in a Field Programmable Gate Array (FPGA) as contemplated in the present invention, but it should be understood that the device drivers could also be external to the FPGA. A common interface 303 for the logical device driver instances comprises a plurality of functions linked to an embedded application 300. Each logical device driver instance, representing an instance of the hardware device, comprises a virtual function table (305, for example) that has pointers that point from each of the plurality of functions of the common interface 303 to functions corresponding to a specific version (307, for example) of the device driver among a plurality of versions (307 and 327, for example) of the device driver.

Preferably, the virtual function table (305, 325, 335) for each logical device driver instance (301, 321, 331) is set up during an initialization of the logical device driver instance through the common interface (303). The virtual function table (305, for example) preferably maps the plurality of functions of the common interface (303) to the plurality of functions of the specific version of the device driver (307, for example). It should be understood that each logical device driver instance (301, 321, 331), representing an instance of the hardware device, points to a specific version of the device driver (307 and 327, for example). Once initialization of logical device driver instances (301, 321, 331) occurs, the embedded application 300 invokes the plurality of functions of the common interface (303) to communicate to the logical device driver instances. The common interface 303 serves as a common device driver interface for multiple versions of the same device. From FIG. 3, it should also be understood that the plurality of function pointers of each virtual function table (305, 325, 335) are dynamically linked during initialization of each logical device driver instance, but then remain statically linked to the single executable of the embedded application 300 until the logical device driver instance is re-initialized.

Additionally, the description above is intended by way of example only and is not intended to limit the present invention in any way, except as set forth in the following claims. Accordingly, the applications and versatility of such a programmable gate array is dramatically enhanced via the use of the present invention. As one of average skill in the art will appreciate, other embodiments may be derived from the teaching of the present invention without deviating from the scope of the claims. For example, instead of multiple versions of the same device, there may be multiple devices of different types that have similar logical functionality such that they can be communicated with using a common interface. In this case, the virtual function tables would point not to different versions of a device driver, but rather to different device drivers altogether.

What is claimed is:

1. A logical device driver instance for a hardware device, comprising:
   a common interface for a device driver, common across all versions of the device driver, containing a plurality of functions linked to at least an embedded application; and
   a virtual function table that points from each of the plurality of functions of the common interface to a plurality of functions of a specific version of the device driver among a plurality of versions of the device driver, wherein a plurality of virtual function table pointers are set up during an initialization of the logical device driver instance.

2. The logical device driver instance of claim 1, wherein the plurality of pointers in the virtual function table are dynamically mapped from the plurality of functions of the common interface to the plurality of functions of a specific version of the device driver during initialization of the logical device driver through the common interface.

3. The logical device driver instance of claim 1, wherein once the initialization of the logical device driver instance occurs, an embedded application invokes the plurality of functions of the common interface to communicate to the logical device driver instance.

4. The logical device driver instance of claim 1, wherein the common interface serves as a common device driver interface for multiple versions of the hardware device.

5. The logical device driver instance of claim 1, wherein the common interface serves as a common device driver interface for multiple logical device driver instances, where each instance represents an instance of the hardware device.

6. The logical device driver instance of claim 1, wherein the hardware device and the device driver are embedded in a Field Programmable Gate Array (FPGA).

7. The logical device driver instance of claim 1, wherein the device driver is external to a Field Programmable Gate Array.

8. The logical device driver instance of claim 1, wherein the hardware device is selected from the group comprising a microprocessor, a microcontroller, a digital signal processor, a physical layer interface, a link layer interface, a network layer interface, an audio processor, a video graphics processor, an applications specific integrated circuit, or any other hardware device having an associated device driver.

9. The logical device driver instance of claim 1, wherein a plurality of logical device driver instances can simultaneously exist and share the same common interface, but each instance of the logical device driver contains its own virtual function table pointing to a specific version of the device driver.

10. The logical device driver instance of claim 1, wherein a plurality of logical device driver instances can simultaneously exist and share the same common interface, but each instance of the logical device driver contains its own virtual function table pointing to a specific version of the device driver, and more than one logical device driver instance can point to the same version of the device driver.

11. The logical device driver instance of claim 1, wherein the virtual function table is set up dynamically during each run-time initialization of the logical device driver instance.

12. The logical device driver instance of claim 11, wherein the virtual function table pointers are dynamically linked during initialization of the logical device driver instance and remain statically linked to an executable of the embedded application until the logical device driver instance is re-initialized.

13. The logical device driver instance of claim 1, wherein the plurality of versions of the device driver comprises different device drivers for different devices having similar logical functionality that can be communicated using the common interface.

14. A method of simultaneously supporting a plurality of device driver versions using a common interface to an embedded application, comprising the steps of:

initializing each logical device driver instance so that a plurality of functions for a given version of a device driver among the plurality of device driver versions are mapped via the common interface using a plurality of virtual function table pointers; and invoking the common interface with the embedded application to communicate with any given version of the device driver.

15. The method of claim 14, wherein the step of initialization comprises setting up the virtual function table during run-time initialization of the logical device driver instance.

16. The method of claim 14, wherein the step of initialization comprises dynamically linking the plurality of virtual function table pointers during initialization of the logical device driver instance.

17. The method of claim 16, wherein the method further comprises the step of having the plurality of virtual function table pointer remain statically linked to an executable of the embedded application until the logical device driver instance is re-initialized.

18. An FPGA-based system-on-chip (SoC), comprising:

a hardware device embedded in the FPGA-based SoC; and a device driver instantiated in the FPGA and coupled to the hardware device, the device driver comprising:

a common interface, wherein the common interface is common across a plurality of versions of the device driver and includes a plurality of functions linked to the hardware device; and a virtual function table that points from each of the plurality of functions of the common interface to a plurality of functions of a specific version of the device driver among the plurality of versions of the device driver, wherein a plurality of virtual function table pointers are set up during an initialization of the device driver.

19. The FPGA-based SoC of claim 18, wherein the plurality of pointers in the virtual function table are dynamically mapped from the plurality of functions of the common interface to the plurality of functions of a specific version of the device driver during initialization of the device driver through the common interface.

20. The FPGA-based SoC of claim 18, wherein once the initialization of the device driver occurs, the hardware device invokes the plurality of functions of the common interface to communicate with the device driver.

21. The FPGA-based SoC of claim 18, wherein:

the FPGA-based SoC includes multiple versions of the hardware device; and the common interface serves as a common device driver interface for the multiple versions of the hardware device.

22. The FPGA-based SoC of claim 18, wherein:

the FPGA-based SoC includes multiple copies of the hardware device and multiple instances of the device driver; and the common interface serves as a common device driver interface for the multiple instances of the device driver, where each instance of the device driver is coupled to an associated copy of the hardware device.

23. The FPGA-based SoC of claim 18, wherein the hardware device is selected from a group of devices consisting of: a microprocessor, a microcontroller, a digital signal processor, a physical layer interface, a link layer interface, a network layer interface, an audio processor, a video graphics processor, and an application specific integrated circuit.

24. The FPGA-based SoC of claim 18, wherein:

the FPGA-based SoC includes multiple instances of the device driver sharing the common interface; and each instance of the device driver includes its own virtual function table pointing to a specific version of the device driver.

25. The FPGA-based SoC of claim 24, wherein more than one instance of the device driver includes a virtual function table pointing to the same version of the device driver.

26. The FPGA-based SoC of claim 18, wherein the virtual function table is set up dynamically during each run-time initialization of the device driver.

27. The FPGA-based SoC of claim 26, wherein the virtual function table pointers are dynamically linked during initialization of the device driver and remain statically linked to an executable of the hardware device until the device driver is re-initialized.

28. The FPGA-based SoC of claim 18, wherein the plurality of versions of the device driver comprise different device drivers for different hardware devices having similar logical functionality that can be communicated using the common interface.

* * * * *